United States Patent
Fu et al.

(10) Patent No.: US 12,495,355 B2
(45) Date of Patent: Dec. 9, 2025

(54) DYNAMIC MESH SERVICE SET IDENTIFIER

(71) Applicant: HEWLETT PACKARD ENTERPRISE DEVELOPMENT LP, Spring, TX (US)

(72) Inventors: Xiaoyang Fu, Beijing (CN); Junyu Pei, Beijing (CN); Kangchang Huang, Beijing (CN)

(73) Assignee: Hewlett Packard Enterprise Development LP, Spring, TX (US)

( * ) Notice: Subject to any disclaimer, the term of this patent is extended or adjusted under 35 U.S.C. 154(b) by 330 days.

(21) Appl. No.: 18/341,269

(22) Filed: Jun. 26, 2023

(65) Prior Publication Data

US 2024/0430787 A1    Dec. 26, 2024

(51) Int. Cl.
| | |
|---|---|
| *H04W 48/16* | (2009.01) |
| *H04W 12/03* | (2021.01) |
| *H04W 48/10* | (2009.01) |
| *H04W 84/18* | (2009.01) |
| *H04W 88/08* | (2009.01) |

(52) U.S. Cl.
CPC .......... *H04W 48/16* (2013.01); *H04W 12/03* (2021.01); *H04W 48/10* (2013.01); *H04W 84/18* (2013.01); *H04W 88/08* (2013.01)

(58) Field of Classification Search
CPC ..... H04W 12/03; H04W 12/73; H04W 48/10; H04W 48/16; H04W 84/12; H04W 84/18; H04W 88/08
See application file for complete search history.

(56) References Cited

U.S. PATENT DOCUMENTS

| 10,412,083 | B2 * | 9/2019 | Zou .................... H04W 12/08 |
| 2007/0147620 | A1 | 6/2007 | Zheng et al. |
| 2007/0206537 | A1 | 9/2007 | Cam-Winget et al. |
| 2009/0169011 | A1 | 7/2009 | Zhao et al. |
| 2012/0230491 | A1 * | 9/2012 | Duo .................... H04W 12/50 370/255 |
| 2014/0293978 | A1 * | 10/2014 | Yang .................... H04L 67/51 370/338 |

(Continued)

OTHER PUBLICATIONS

Vanhoef et al, "Denial-Of-Service Attacks Against The 4-Way Wi-Fi Handshake", 2017, 10 Pgs.

*Primary Examiner* — Awet Haile
(74) *Attorney, Agent, or Firm* — Hewlett Packard Enterprise Patent Department

(57) ABSTRACT

Implementations of the present disclosure relate to dynamic mesh service set identifiers (SSIDs). In the implementations, a first AP broadcasts a probe request including a first identifier and a first random number. The first AP receives a probe response including a second identifier and a second random number from a second AP. The first AP generates a first SSID based on the first identifier, the first random number, the second identifier and the second random number. The first AP transmits an authentication request including the first SSID to the second AP. The first AP receives an authentication response to the authentication request from the second AP. In this way, the mesh SSIDs associated with different mesh links are different so that other mesh APs would not be attacked even if a mesh SSID of one mesh AP in the same mesh cluster is exposed.

18 Claims, 11 Drawing Sheets

(56) References Cited

U.S. PATENT DOCUMENTS

| | | | |
|---|---|---|---|
| 2014/0337950 A1* | 11/2014 | Yang | H04L 9/3297 |
| | | | 726/7 |
| 2016/0192186 A1 | 6/2016 | Lin | |
| 2017/0118754 A1* | 4/2017 | Kang | H04W 72/541 |
| 2024/0196457 A1* | 6/2024 | Asterjadhi | H04W 36/00692 |
| 2024/0340638 A1* | 10/2024 | Ho | H04W 12/106 |

* cited by examiner

DYNAMIC MESH SERVICE SET IDENTIFIER

BACKGROUND

When a mesh access point (AP) boots up, it needs to discover and join a mesh network to establish peer relationships with other mesh APs. The discovery process uses the standard active and passive scanning mechanisms. Mesh APs participating in a mesh basic service set (MBSS) send beacons and answer to the probe requests with probe responses. The probe requests and responses contain mesh profile information. The mesh profile is a set of parameters that specifies the attributes of the MBSS, including a Mesh identifier (ID). In the MBSS, all mesh APs use the same mesh profile. A mesh AP cannot establish a peering with another mesh AP if their mesh profiles are different.

BRIEF DESCRIPTION OF THE DRAWINGS

Implementations of the present disclosure may be understood from the following Detailed Description when read with the accompanying figures. In accordance with the standard practice in the industry, various features are not drawn to scale. In fact, the dimensions of the various features may be arbitrarily increased or reduced for clarity of discussion. Some examples of the present disclosure are described with respect to the following figures.

DETAILED DESCRIPTION

Figure 1:
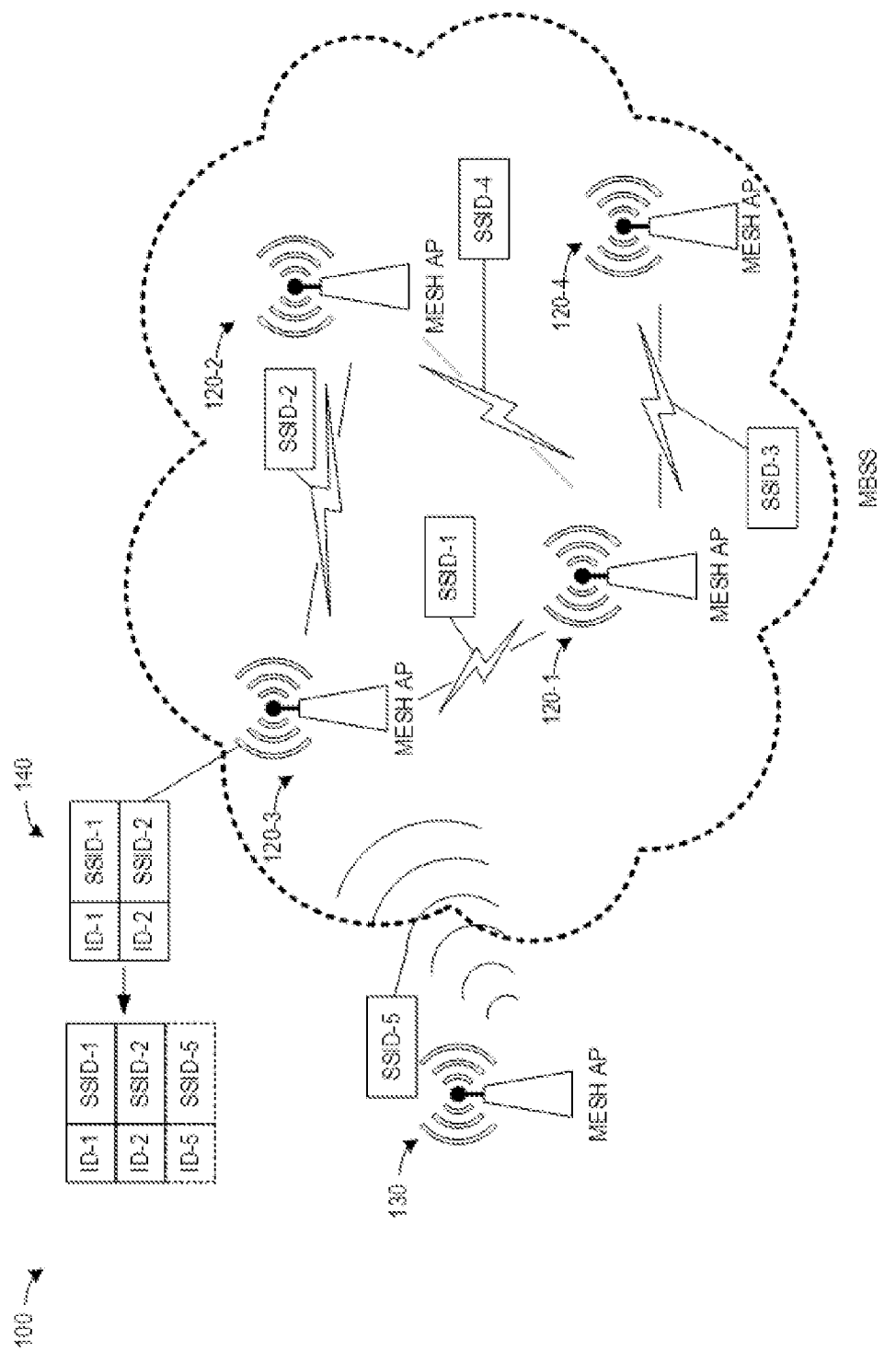
FIG. 1 illustrates an example network environment in which example implementations of the present disclosure may be implemented.

A wireless network has a service set identifier (SSID) which is a sequence of characters that uniquely identifies the network and therefore is sometimes referred to as a network name. The SSID allows stations (STAs) to connect to the desired network when multiple independent networks operate in the same physical area. In the case of a MBSS, the access points (APs) in a mesh cluster use the same fixed SSID to communicate with each other for authentication during link establishment. An AP, which is currently not associated with any of the APs in one mesh network but configured with the same mesh profile, may be referred to as a non-member mesh AP. Comparatively, an AP operating as part of the mesh network may be referred to as a member mesh AP. Conventionally, during the discovery process for a non-member mesh AP to join a MBSS, the non-member mesh AP transmits a probe request to a member mesh AP. The probe request may include a mesh SSID. The mesh SSID, which may also be referred to as mesh ID, is an identifier of an MBSS. The mesh SSID may be installed in mesh capable devices by a variety of means. For example, the mesh SSID might be set by the user. In one example, a mesh AP shall include the mesh SSID element in its beacon and probe response frames to advertise its identity. When the member mesh AP receives the probe request, the member mesh AP verifies the non-member mesh AP by checking whether the received mesh SSID is the same as a mesh SSID of the member mesh AP.

In one example, for security purposes, the mesh APs use a hidden mesh SSID to communicate with each other for automatically onboarding. In this case, the mesh SSID information will not be carried in a broadcast probe request frame. However, when a mesh AP sends a unicast probe request, the mesh SSID information in the unicast probe request can still be sniffed by a third party and may be exposed to a potential attacker, which may weaken the mesh link security. Since the whole mesh cluster uses the same mesh SSID to establish the mesh link, if the mesh SSID of one mesh AP is exposed, all mesh APs in the same cluster may encounter security issues.

Various example implementations of the present disclosure propose an authentication mechanism with dynamic SSIDs for a mesh network. The present disclosure provides a mechanism for authentication between a member mesh AP and a non-member mesh AP with a dynamic mesh SSID. In this mechanism, after the non-member mesh AP boots up, it will broadcast a probe request, which includes an identifier and a random number. After the member mesh AP receives this probe request, the member mesh AP will send a unicast probe response with another random number and its identifier such as a serial number. Then, the member mesh AP and the non-member mesh AP use these values to generate a mesh SSID exclusive for this pair of mesh APs for further verification and authentication to establish mesh links.

With these implementations, in each mesh link establishment stage, a dynamic mesh SSID exclusive for the corresponding pair of mesh APs will be generated and used for authentication. As a result, each mesh link is associated with a unique mesh SSID. If one dynamic mesh SSID of one mesh AP in the mesh network is exposed, the other mesh APs are still safe, thereby improving an overall security level of the mesh network.

FIG. 1 illustrates an example network environment 100 in which example implementations of the present disclosure may be implemented. As illustrated in FIG. 1, the network environment 100 includes a mesh basic service set (MBSS) 110. The MBSS 110 is a BSS that forms a self-contained network of mesh APs. In the illustrated implementation, the MBSS 110 contains for example four mesh APs, including a mesh AP 120-1, a mesh AP 120-2, a mesh AP 120-3, and a mesh AP 120-4. The mesh AP 120-1, the mesh AP 120-2, the mesh AP 120-3 and the mesh AP 120-4 may also be referred to as members of the MBSS 110.

Conventionally, the mesh APs in the same MBSS use the same mesh profile including a mesh ID. However, in order to improve the security level of the MBSS, each mesh link established between two mesh APs illustrated in FIG. 1 may be associated with a unique mesh SSID negotiated by two peering mesh APs during link establishment stage. Specifically, when a non-member mesh AP attempts to become a member of the MBSS 110 by initiating a discovery procedure, the non-member mesh AP and a neighbor member mesh AP may negotiate a pairwise SSID. After the pairwise SSID is obtained, the member mesh AP may add the newly-negotiated SSID in a SSID table where the negotiated SSIDs are indexed by the identifier of the non-member mesh AP.

For example, when the mesh AP 120-3 establishes a link with the mesh AP 120-1, the mesh AP 120-3 and the mesh AP 120-1 have negotiated a pairwise SSID, SSID-1. The mesh AP 120-3 has added the SSID-1 in the SSID table and indexed the SSID-1 with an identifier ID-1 of the mesh AP 120-1, for example with a basic service set identifier (BSSID) of the mesh AP 120-1. Similarly, the mesh AP 120-3 has also added the SSID-2 which is negotiated by the mesh AP 120-3 and the mesh AP 120-2 and the SSID-2 is indexed with ID-2. Generally, each mesh AP maintains an SSID table. For example, the SSID table maintained by the mesh AP 120-1 may include an SSID-1, an SSID-3 and an SSID-4 and the SSID table maintained by the mesh AP 120-2 may include an SSID-2 and the SSID-4.

The network environment 100 further includes a non-member mesh AP 130. The non-member mesh AP 130 is configured with the mesh profile corresponding to the mesh profile of the MBSS 110. The non-member mesh AP 130 initiates the discovery procedure by broadcasting a probe request and negotiates a pairwise SSID, SSID-5, with the member mesh AP 120-3. The member mesh AP 120-3 adds the newly-negotiated SSID-5 into the SSID table. Then, the member mesh AP 120-3 may authenticate the non-member mesh AP 130 based on the SSID table and the negotiated pairwise SSID. The SSID negotiation procedure will be described in details later with reference to FIGS. 2A-2D.

Figure 2A:
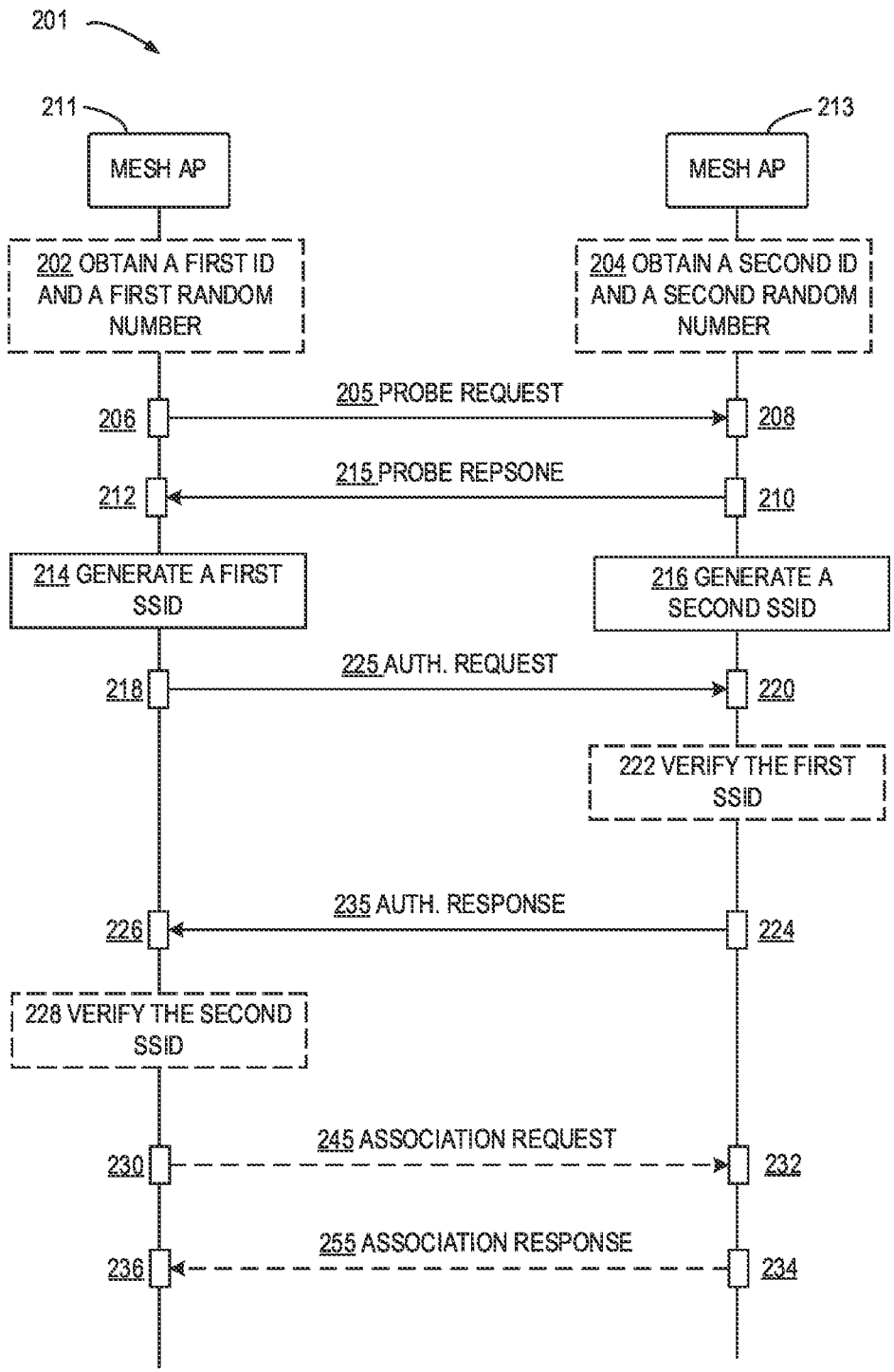
FIG. 2A illustrates a signaling diagram for an example authentication procedure in accordance with some example implementations of the present disclosure.

FIG. 2A illustrates a signaling diagram for an example authentication procedure 201 in accordance with some example implementations of the present disclosure. The authentication procedure 201 is implemented between a non-member mesh AP 201 and a member mesh AP 203. The mesh AP 201 may be corresponding to the mesh AP 130 in FIG. 1 and the mesh AP 203 may be corresponding to the AP 120-3 in FIG. 1.

As illustrated in FIG. 2A, at 202, the mesh AP 211 may first obtain a first identifier of the mesh AP 211 and a first random number. At 204, the mesh AP 213 may also obtain a second identifier of the mesh AP 213 and a second random number. In some example implementations, the first identifier may be a serial number of the mesh AP 211, and the second identifier may be a serial number of the mesh AP 213. It should be appreciated that the identifier of the mesh AP may be any identifier that may uniquely identify the mesh AP. In some example implementations, the identifier may be installed on the AP and the AP may read the identifier from its memory. In some example implementations, the first random number and the second random number may be generated respectively at the mesh AP 211 and the mesh AP 213.

At 206, after the values for generating the dynamic SSID are obtained, the mesh AP 211 broadcasts a probe request 205 including the first identifier and the first random number. At 208, the mesh AP 213 receives the probe request 205. At 210, the mesh AP 213 transmits a unicast probe response 215 to the mesh AP 211. At 212, the mesh AP 211 receives the probe response 215. At 214, the mesh AP 211 generates a first SSID based on the first random number, the first ID, the second random number and the second ID according to a specific algorithm. Similarly, at 216, after the mesh AP 213 obtains the first random number and the first ID, the mesh AP 213 generates a second SSID based on the first random number, the first ID, the second random number and the second ID according to the same specific algorithm which is only provisioned on the mesh APs with the same mesh profile. The mentioned specific algorithm will be described in detail later with reference to FIG. 2B.

Both the mesh AP 211 and the mesh AP 213 use the same parameters and the same algorithm to generate the pairwise mesh SSID. Therefore, the mesh SSIDs generated at both sides should be identical. Since the pairwise mesh SSIDs are obtained at both sides, it may enter the authentication stage.

At 218, the mesh AP 211 transmits an authentication request 225 to the mesh AP 213. The authentication request 225 includes the generated first SSID. At 220, the mesh AP 213 receives the authentication request 225. At 222, the mesh AP 213 may verify the first SSID. The verification procedure 222 will be described in details with reference to FIG. 2C. At 224, after the first SSID is successfully verified, the mesh AP 213 transmits an authentication response 235 to the mesh AP 211. At 226, the mesh AP 211 receives the authentication response 235. The authentication response 235 includes the generated second SSID. At 228, the mesh AP 211 obtains the second SSID from the authentication response 235 and verifies the second SSID. The verification procedure 228 will be described in detail with reference to FIG. 2C. At 230, after the second SSID is successfully verified, the mesh AP 211 transmits an association request 245 to the mesh AP 213. At 232, the mesh AP 213 receives the association request 245. At 234, the mesh AP 213 transmits an association response 255. At 236, the mesh AP 211 receives association response 255. In this way, a link is established between the mesh AP 211 and the mesh AP 213.

In some example implementations, the dynamic pairwise SSID may need to be re-negotiated. In this way, the existing pairwise SSID may only be used once, and thus a third party that attempts to connect with the mesh APs would not provide a valid pairwise SSID due to lack of knowledge of the specific algorithm used.

Figure 2B:
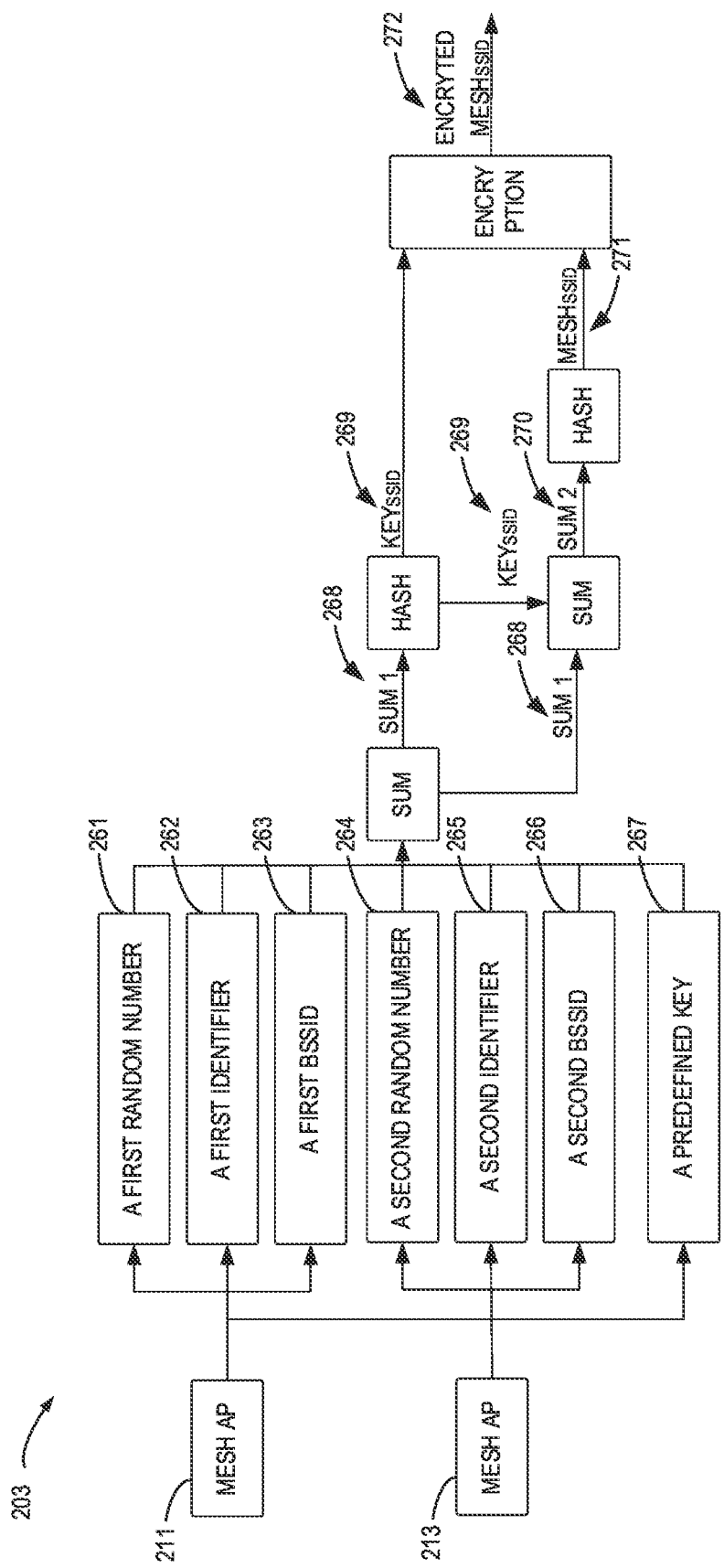
FIG. 2B illustrates an example procedure for calculating a service set identifier (SSID) in accordance with some example implementations of the present disclosure.

FIG. 2B illustrates an example procedure 203 for calculating an SSID in accordance with some example implementations of the present disclosure. As illustrated in FIG. 2B, the procedure 203 requires seven inputs, including a first random number 261, a first identifier 262, a first BSSID 263 from the non-member mesh AP 211 and a second random number 264, a second identifier 265, a second BSSID 266 from the member mesh AP 213 as well as a predefined key 267 stored on both the mesh AP 211 and the mesh AP 213. The mesh APs usually are of the same model and from the same producer. A predefined key may be stored when the mesh AP is produced. The predefined key 267 may not be transmitted without encryption. Therefore, a third party cannot sniff the predefined key 267.

In one example, seven inputs are summed up to obtain a SUM 1 268 according to the following formula:

$$\text{Sum 1} = R_S + ID_S + BSSID_S + R_A + ID_A + BSSID_A + K \quad (1)$$

where $R_S$ denotes the first random number 261; $ID_S$ denotes the first identifier 262; $BSSID_S$ denotes the first BSSID 263; $R_A$ denotes the second random number 264, $ID_A$ denotes the second identifier 265; $BSSID_A$ denotes the second BSSID 266; K denotes the predefined key 267. It should be appreciated that SUM 1 268 may also be calculated at least from two random numbers provided by both sides of the negotiation and a predefined key. The present disclosure makes no limitations with respect of this aspect.

On one side, the SUM 1 268 is hashed to obtain an intermediate key referred to as KEYssid 269 according to the following formula:

$$KEY_{ssid} = \text{Hash (SUM 1)} \quad (2)$$

where Hash denotes the hash operator.

On the other side, the SUM 1 268 is summed up with KEYssid 269 to obtain a SUM 2 270 according to the following formula:

$$\text{sum 2} = \text{SUM 1} + KEY_{ssid} \quad (3)$$

Then, the SUM 2 270 is hashed to obtain a SSID for mesh authentication which is referred to as MESHssid 271 according to the following formula:

$$MESH_{ssid} = \text{Hash (SUM 2)} \quad (4)$$

At last, the MESHssid 271 is encrypted with KEYssid 269 to obtain an encrypted SSID, i.e., the encrypted MESHssid 272.

Figure 2C:
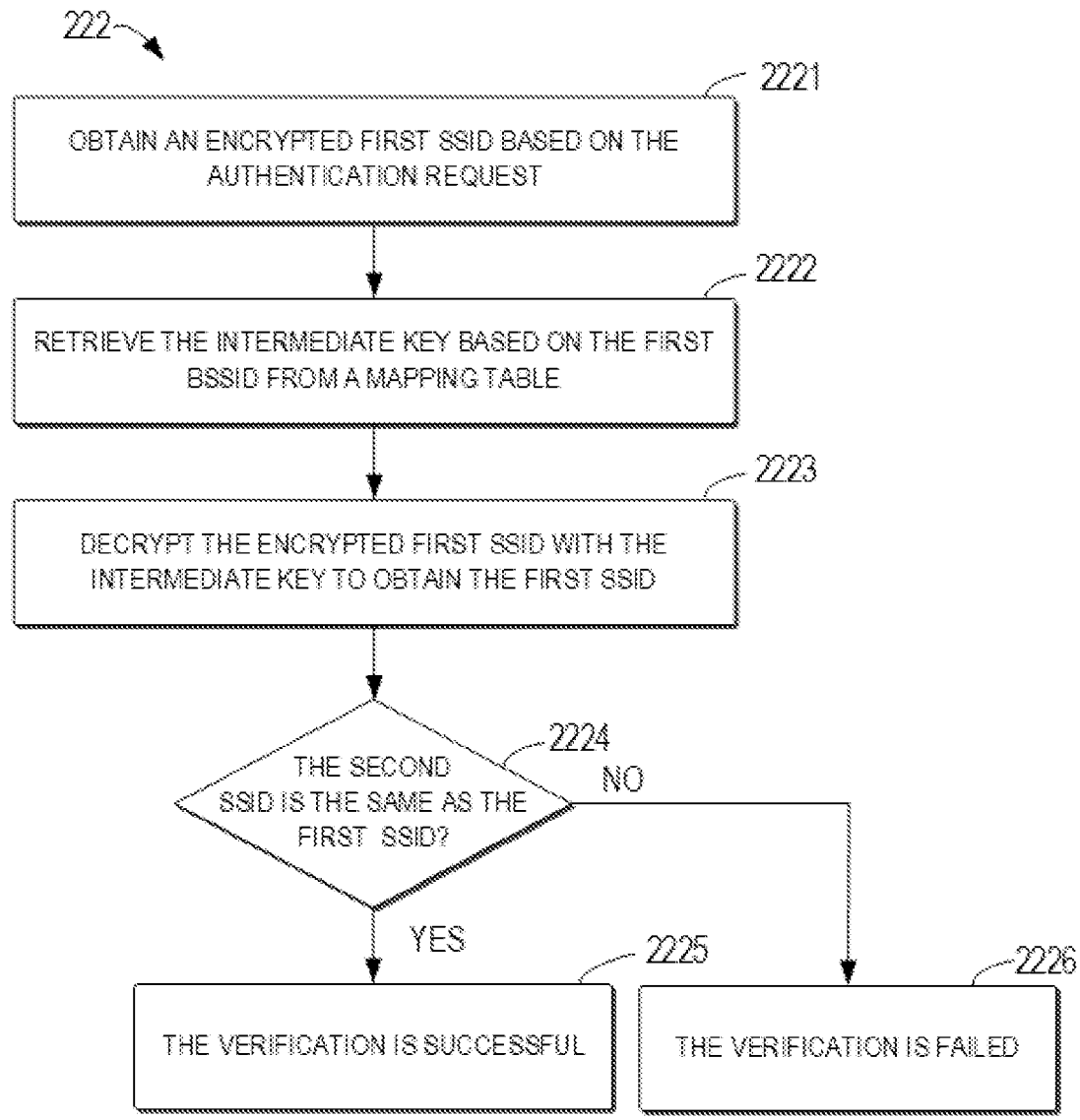
FIG. 2C illustrates a flowchart of an example verification method in accordance with some example implementations of the present disclosure.

FIG. 2C illustrates a flowchart of an example verification method 222 in accordance with some example implementations of the present disclosure. The verification method may be corresponding to the step 222 as illustrated in FIG. 2A and implemented by the mesh AP 213.

At 2221, when the member mesh AP 213 receives an authentication request from the non-member mesh AP 211, the member mesh AP 213 obtains an encrypted first SSID based on the authentication request. For example, the encrypted first SSID may be generated according to the SSID calculating procedure 203 as illustrated in FIG. 2B. In this case, a first intermediate key may be obtained and the first SSID is a pairwise mesh SSID encrypted with the first intermediate key. In some example implementations, the mesh SSID may be encrypted with the first intermediate key according to an Advanced Encryption Standard (AES) Cipher-based Message Authentication Code (CMAC) encryption algorithm.

At 2222, the member mesh AP 213 retrieves the first intermediate key based on the first BSSID from a mapping table. The mapping table may be corresponding to the SSID table as illustrated in FIG. 1. In this case, the mapping table includes intermediate keys associated with all the mesh APs connected with the mesh AP 213. The intermediate keys are generated at the mesh AP 213 side and indexed by corresponding BSSID of the connected mesh APs. In some example implementations, the mapping table may further include the random numbers and the identifiers received from the connected mesh APs.

At 2223, the member mesh AP 213 decrypts the encrypted first SSID with the retrieved intermediate key to obtain the first SSID. For example, when the received first SSID is encrypted according to the AES CMAC encryption algorithm, the member mesh AP 213 may decrypt the first SSID according to a corresponding AES CMAC decryption algorithm. At 2224, the member mesh AP 213 determines whether the first SSID is the same as the second SSID calculated at the mesh AP 213 side. If the member mesh AP 213 determines that the first SSID is the same as the second SSID, then the method 222 proceeds to 2225. At 2225, the member mesh AP 213 determines that the verification is successful. Thereafter, the member mesh AP 213 may transmit an authentication response. If the member mesh AP 213 determines that the first SSID is not the same as the second SSID, then the method 222 proceeds to 2226. At 2226, the member mesh AP 213 determines that the verification is failed. In this case, member mesh AP 213 may not respond to the authentication request.

Figure 2D:
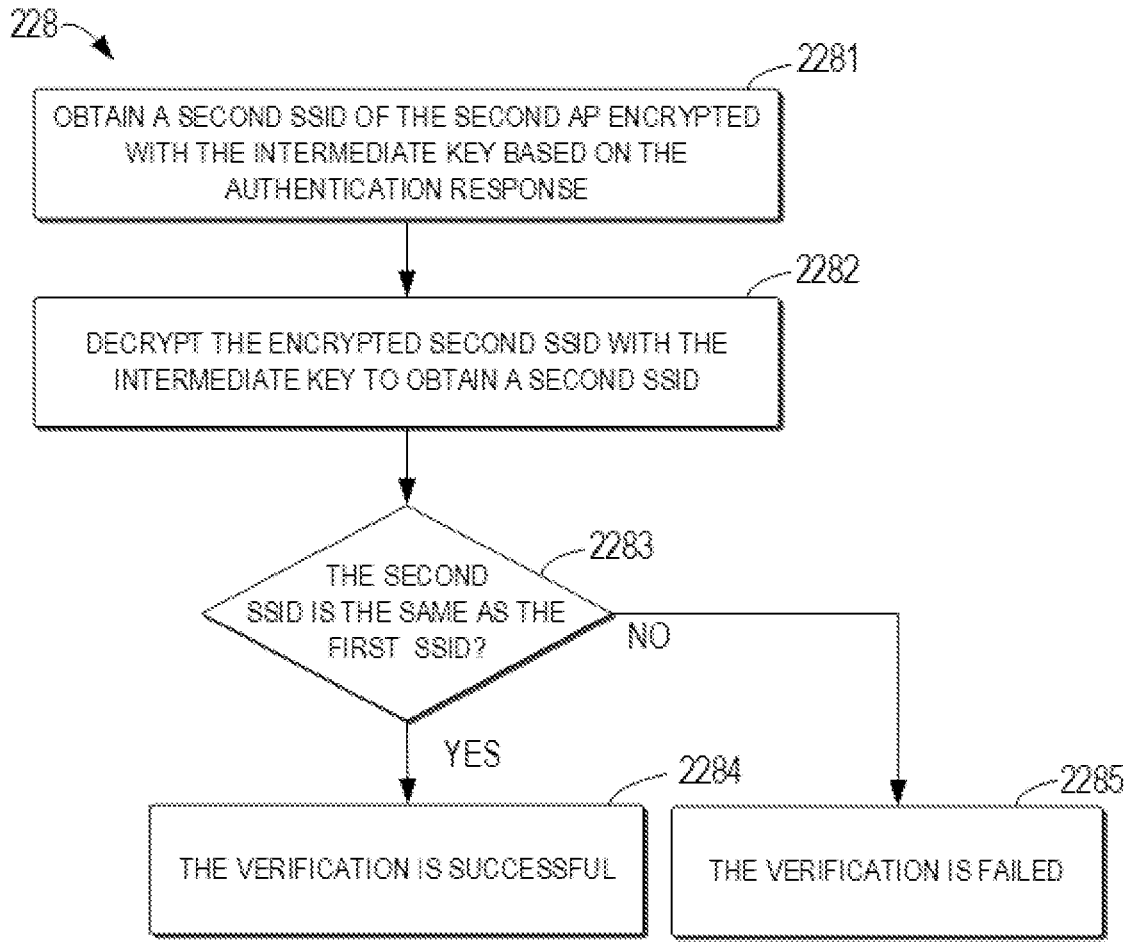
FIG. 2D illustrates a flowchart of another example verification method in accordance with further example implementations of the present disclosure.

FIG. 2D illustrates a flowchart of an example verification method 228 in accordance with further example implementations of the present disclosure. The verification method 228 may be corresponding to the step 228 as illustrated in FIG. 2A and implemented by the mesh AP 211.

At 2281, when the mesh AP 211 receives the authentication response from the mesh AP 213, the mesh AP 211 obtains a second SSID of the mesh AP 213 based on the authentication response. The second SSID may also be derived according to the SSID calculating procedure 203 as illustrated in FIG. 2B. At 2282, the mesh AP 211 decrypts the encrypted second SSID with the intermediate key to obtain a second SSID.

At 2283, the mesh AP 211 determines whether the second SSID is the same as the first SSID. If the mesh AP 211 determines that the second SSID is the same as the first SSID, then the method 228 proceeds to 2284. At 2284, the mesh AP 211 determines that the verification is successful. If the mesh AP 211 determines that the second SSID is not the same as the first SSID, the method proceeds to 2285. At 2285, the mesh AP 211 determines that the verification is failed. After the mesh AP 211 successfully verifies the second SSID, the mesh AP 211 may transmit an association request to the mesh AP 213 to establish the mesh link.

Within a mesh BSS, direct communications between neighbor mesh APs are allowed only when they are peer mesh APs. After the mesh link is established between two mesh APs during mesh discovery, two neighbor mesh APs agree to establish a mesh peering to each other, and, after successfully establishing the mesh peering, they become peer mesh APs. A mesh AP can establish a mesh peering with multiple neighbor mesh APs.

In the authenticated peering procedure, a pairwise key will be negotiated. Conventionally, some of the frame exchanges during the authenticated peering procedure maybe performed without encryption which makes the procedure vulnerable to attackers. Since an intermediate key may be obtained during the link establishment, the peering procedure may also be benefit from the pairwise intermediate key. The corresponding key negotiation mechanism with some example implementations of the present disclosure will be described with reference to FIGS. 3-4A.

Figure 3:
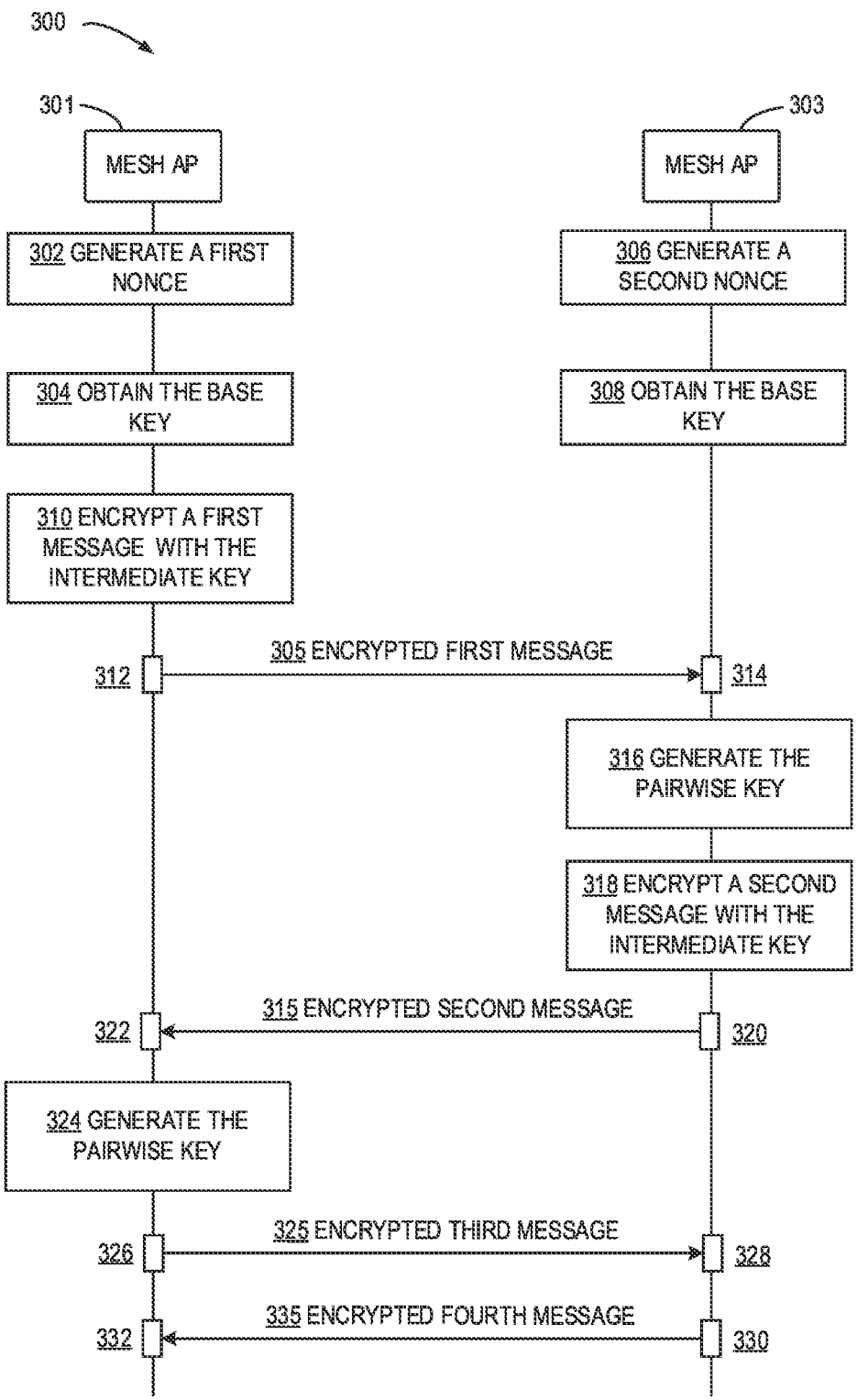
FIG. 3 illustrates a signaling diagram for an example key negotiation procedure in accordance with some example implementations of the present disclosure.

FIG. 3 illustrates a signaling diagram for an example key negotiation procedure 300 in accordance with some example implementations of the present disclosure. The key negotiation procedure 300 may be implemented by a mesh AP 301 and a mesh AP 303. The mesh AP 301 may also be referred to as an authenticator and the mesh AP 303 may also be referred to as a supplicant.

At 302, the mesh AP 301 generates a first nonce. At 304, the mesh AP 301 obtains a base key. At 306, the mesh AP 303 generates a second nonce. At 308, the mesh AP 303 obtains the same base key. In some example implementations, the base key may be a pairwise master key (PMK) which may be established based on the mesh SSID before the peering procedure.

At 310, the mesh AP 301 encrypts a first message with the intermediate key. At 312, the mesh AP 301 transmits the encrypted first message to the mesh AP 303. At 314, the mesh AP 303 receives the encrypted first message. At 316, the mesh AP 303 decrypts the encrypted first message with the intermediate key and generates a pairwise key based on the first nonce and the second nonce. In some example implementations, the pairwise key may be a pairwise transient key (PTK). The PTK may be derived from the first nonce, the second nonce and the PMK. At 318, the mesh AP 303 encrypts a second message with the intermediate key. At 320, the mesh AP 303 transmits the encrypted second message 315 to the mesh AP 301. At 322, the mesh AP 301 receives the encrypted second message 315. At 324, the mesh AP 301 decrypts the encrypted first message with the intermediated key and generates the pairwise key. At 326, the mesh AP 301 transmits an encrypted third message 325 to the mesh AP 303. At 328, the mesh AP 303 receives the encrypted third message 325. At 330, the mesh AP 303 transmits an encrypted fourth message 335 to the mesh AP 301. At 332, the mesh AP 301 receives the encrypted fourth message 335.

The key negotiation procedure 300 may be corresponding to a 4-way handshake procedure. The first message may be a 4-way handshake message 1. The 4-way handshake message 1 is an Extensible Authentication Protocol Over Lan (EAPOL) Key frame and include an authenticator nonce. The second message may be a 4-way handshake message 2. The 4-way handshake message 2 is also an EAPOL Key frame and includes a supplicant nonce. In some example implementations, the first message may include a base key for subsequent key generation. Conventionally, the EAPOL message one and the EAPOL message two are not encrypted. However, in the illustrated implementations, all the messages are encrypted. In this way, the security level of the key negotiation procedure can be improved.

Figure 4A:
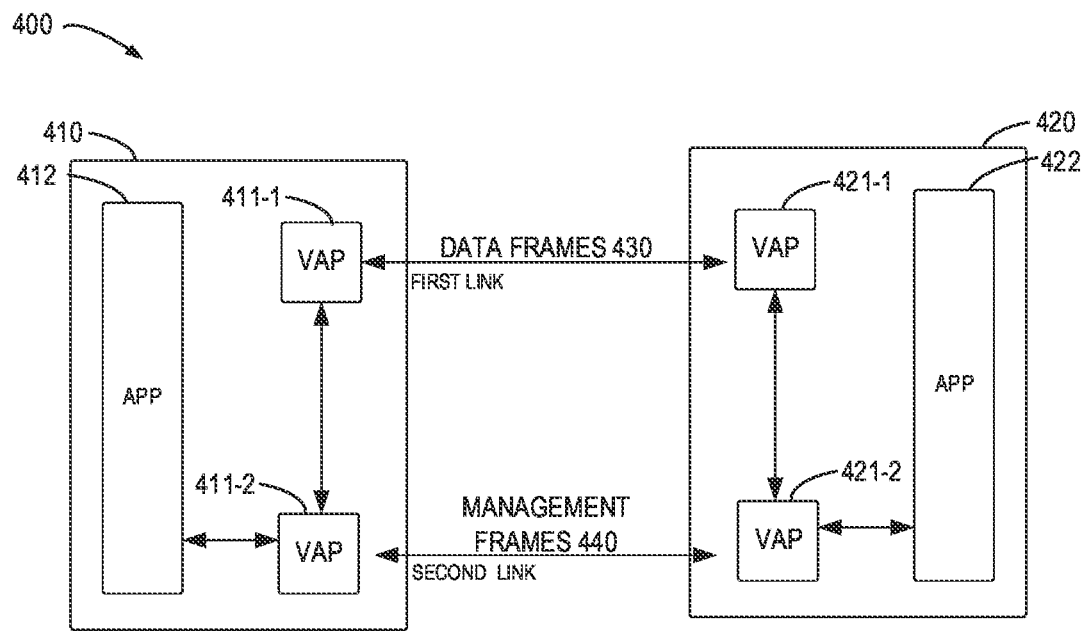
FIG. 4A illustrates an example procedure for updating pairwise key in accordance with some example implementations of the present disclosure.

FIG. 4A illustrates an example procedure 400 for updating pairwise key in accordance with some example implementations of the present disclosure. The procedure 400 may be implemented by a mesh AP 410 and a mesh AP 420. The mesh AP 410 peers with the mesh AP 420 and a first link is established between a virtual access point (VAP) 411-1 of the mesh AP 410 and a VAP 421-1 of the mesh AP 420. As illustrated in FIG. 4A, after the mesh link between the mesh AP 410 and the mesh AP 420 is established, the mesh AP 410 will maintain an internal timer for updating the pairwise key. In some example implementations, a lifetime for one pairwise key, which is corresponding to a duration of the timer, may be configured during the key negotiation procedure.

If the timer is expired, the pairwise key will be re-negotiated. In the re-negotiation procedure, the mesh AP 410 and the mesh AP 420 will establish a second link between a VAP 411-2 of the mesh AP 410 and a VAP 421-2 of the mesh AP 420 by exchanging management frames 440. For example, the VAP 411-2 may transmit a probe request frame to the VAP 421-2 and receive a probe response frame from the VAP 421-2. Then, the VAP 411-2 may transmit an authentication request frame to the VAP 421-2 and receive an authentication response frame from the VAP 421-2. The discovery and authentication procedures may be performed according to corresponding procedures as illustrated in FIG. 2. The first link and the second link may operate on the same radio bandwidth.

The VAP 411-2 transmits a trigger frame for negotiation of a new pairwise key to the VAP 421-2 to trigger a key updating. In the illustrated implementation, the mesh AP 420 functions as an authenticator and the mesh AP 410 functions as a supplicant. During the key updating procedure, both the mesh AP 410 and the mesh AP 420 encapsulate the key negotiation frames as payload in data frames before transmission. In turn, when the mesh AP 410 and the mesh AP 420 receive the data frames, the mesh AP 410 and the mesh AP 420 decapsulate the data frames to obtain the key negotiation frames. By exchanging key negotiation frames encapsulated in the data frames on the first link, the mesh AP 410 and the mesh AP 420 can negotiate a new pairwise key.

For the purpose of discussion and without loss of generality, a 4-way handshake procedure for updating the pairwise key will be described with reference to FIG. 4A. After management stage, the mesh AP 410 and the mesh AP 420 will prepare to transmit EAPOL key frames. At first, a host application 422 at the authenticator side, for example a host access point daemon (Hostapd), will send an EAPOL key 1 frame (also referred to as handshake message 1) to the VAP 421-2. Then, the VAP 421-2 forwards the EAPOL key 1 frame to the VAP 421-1. After the VAP 421-1 receives the EAPOL key 1 frame from the VAP 421-2, the VAP 421-1 marks the EAPOL key 1 frame as a payload, and then may capsulate the frame along with an ID field into a data frame. The ID field indicates whether the data frame contains an EAPOL key frame.

After the capsulation, the VAP 421-1 transmits the data frame to the VAP 411-1. Since the data frame is transmitted on the original mesh link, the data frame is encrypted thereby improving the security level of the EAPOL key 1 frame. After the VAP 411-1 receives the encrypted data frame, the VAP 411-1 decrypts the data frame with the original PTK. After the decryption, the VAP 411-1 detects the ID field to determine whether the ID field indicates an EAPOL key frame. In some example implementations, a supplicant mesh AP may also maintain a timer for updating the pairwise key and the supplicant mesh AP may only detect the ID field when the timer is expired. Relatively, when the timer has not been expired, the supplicant mesh AP may not expect that an EAPOL key frame is included and may not detect the ID field. In this way, the efficiency of the key updating procedure is improved.

After the VAP 411-1 determines that the data frame is encapsulated with the EAPOL key frame, the VAP 411-1 may decapsulate the data frame to obtain the EAPOL key 1 frame and forward the EAPOL key 1 frame to the VAP 411-2. Thereafter, the VAP 411-2 sends the EAPOL key 1 frame to its user application 412, for example a supplication application. Upon receipt of the EAPOL key 1 frame, the application 412 transmits an EAPOL key 2 frame to application 422 in the same manner. Similarly, an EAPOL key 3 frame and an EAPOL key 4 frame are also transmitted in the same manner.

After a new pairwise key is negotiated, the mesh AP 410 and the mesh AP 420 perform the internal session synchronization. After the synchronization, the traffic starts to be transmitted on the second link and the first link is disconnected. With this implementation, a new pairwise key is updated without disconnecting the originally-established link thereby avoiding traffic flapping.

It should be appreciated that although the key updating procedure is described with respect to a 4-way handshake, it can also be used for other key negotiation procedures where two mesh APs exchange parameters for key derivation.

Figure 4B:
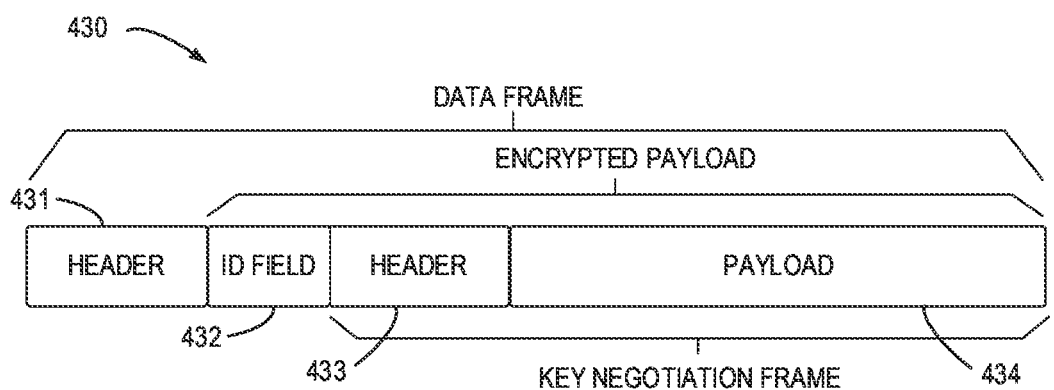
FIG. 4B illustrates an example structure of a data frame for key updating in accordance with some example implementations of the present disclosure.

FIG. 4B illustrates an example structure of a data frame 430 for key updating in accordance with some example implementations of the present disclosure. As illustrated in FIG. 4B, a data frame 430 includes a header 431 and an encrypted payload. The encrypted payload includes an ID field and a key negotiation frame. The ID field may indicate whether the data frame is encapsulated with a key negotiation frame as payload. The key negotiation frame includes a header 433 and a payload 434. The key negotiation frame may be one of: a handshake message 1 frame, a handshake message 2 frame, a handshake message 3 frame, or a handshake message 4 frame.

Figure 5:
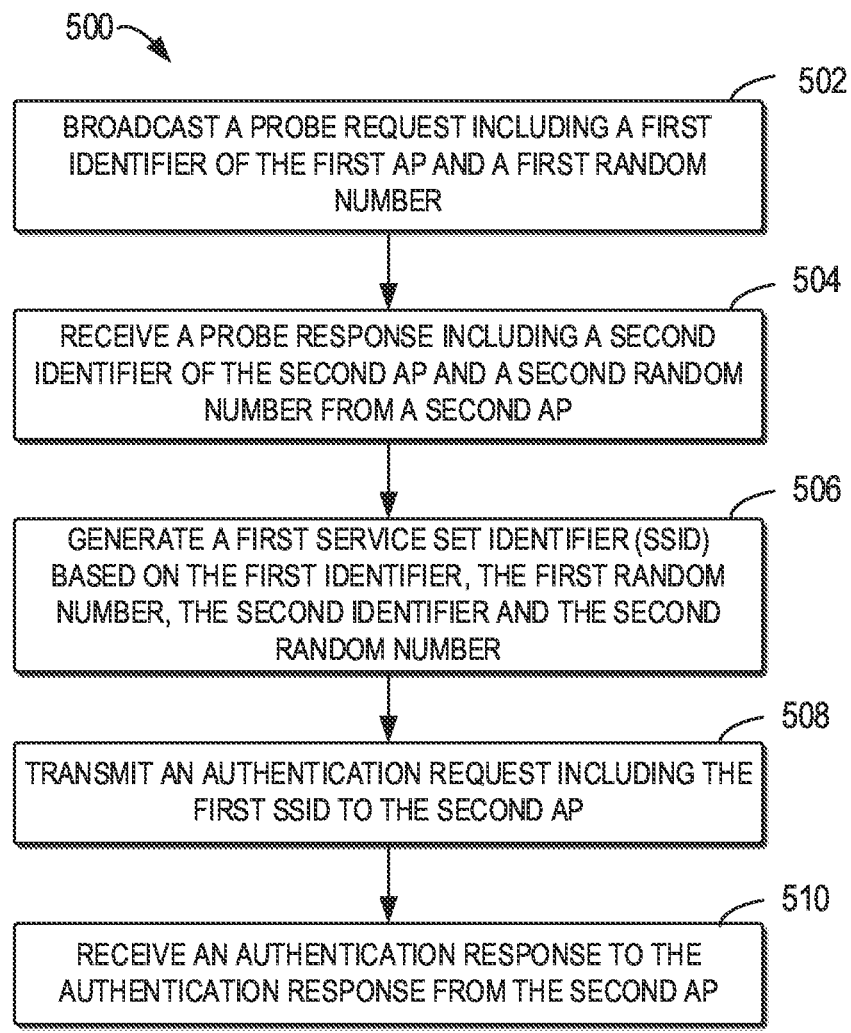
FIG. 5 illustrates a flowchart of an example SSID negotiation method in accordance with some example implementations of the present disclosure.

FIG. 5 illustrates a flowchart of an example SSID negotiation method 500 in accordance with some example implementations of the present disclosure. For the purpose of discussion, the method 500 will be described with reference to FIG. 1. It would be appreciated that although the method 500 has been described as referring to the network environment 100 of FIG. 1, this method 500 may be likewise applied to other similar communication scenarios. For example, the method 500 may be implemented by the non-member mesh AP 130 in FIG. 1. While only some blocks are illustrated in the method 500, the method 500 may comprise other blocks described herein.

At 502, the mesh AP 130 broadcasts a probe request including a first identifier of the first AP and a first random number. At 504, the mesh AP 130 receives a probe response including a second identifier of the second AP and a second random number from the mesh AP 120-3. At 506, the mesh AP 130 generates a first service set identifier (SSID) based on the first identifier, the first random number, the second identifier and the second random number. At 508, the mesh AP 130 transmits an authentication request including the first SSID to the mesh AP 120-3. At 510, the mesh AP 130 receives an authentication response to the authentication request from the mesh AP 120-3.

Figure 6:
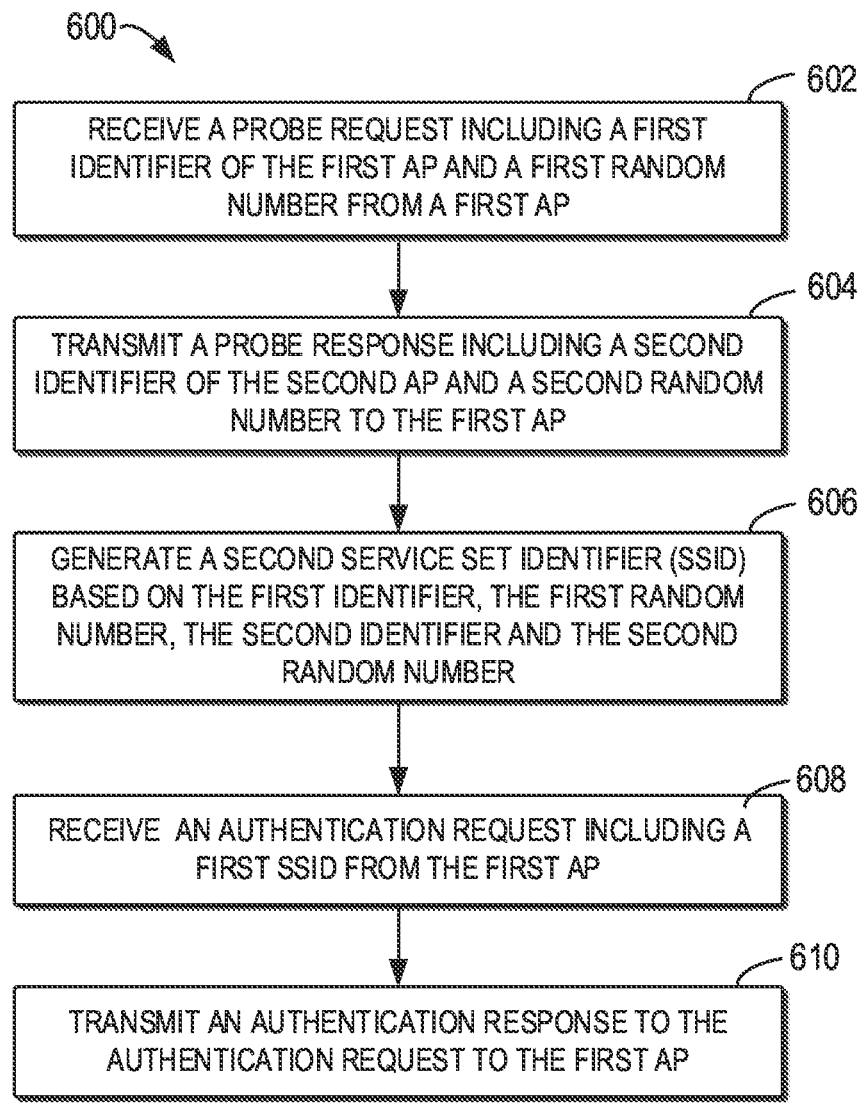
FIG. 6 illustrates a flowchart of another example SSID negotiation method in accordance with further example implementations of the present disclosure.

FIG. 6 illustrates a flowchart of an example SSID negotiation method 600 in accordance with further example implementations of the present disclosure. For the purpose of discussion, the method 600 will be described with reference to FIG. 1. It would be appreciated that although the method 600 has been described as referring to the network environment 100 of FIG. 1, this method 600 may be likewise applied to other similar communication scenarios. For example, the method 600 may be implemented by the member mesh AP 120-3 in FIG. 1. While only some blocks are illustrated in the method 600, the method 600 may comprise other blocks described herein.

At 602, the mesh AP 120-3 receives a probe request including a first identifier of the first AP and a first random number from the mesh AP 130. At 604, the mesh AP 120-3 transmits a probe response including a second identifier of the second AP and a second random number to the mesh AP 130. At 606, the mesh AP 120-3 generates a second service set identifier (SSID) based on the first identifier, the first random number, the second identifier and the second random number. At 608, the mesh AP 120-3 receives an authentication request including a first SSID from the mesh AP 130. At 610, the mesh AP 120-3 transmits an authentication response to the authentication request to the mesh AP 130.

Figure 7:
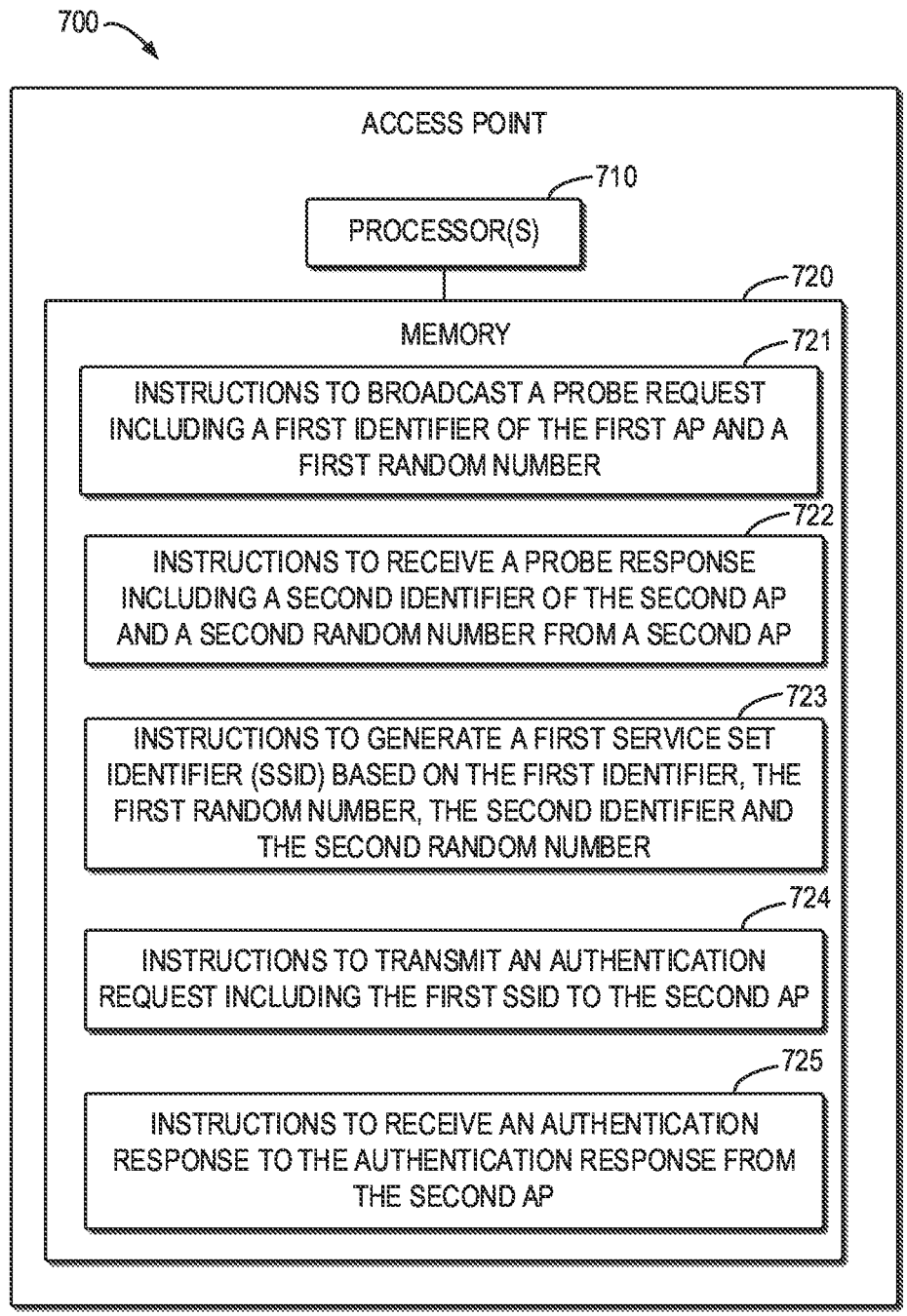
FIG. 7 illustrates a block diagram of an example AP in accordance with some example implementations of the present disclosure.

FIG. 7 illustrates a block diagram of an example AP 700 in accordance with some example implementations of the present disclosure. The AP 700 may be corresponding to the mesh AP 130 in FIG. 1, the mesh AP 303 in FIG. 3, and the mesh AP 410 in FIG. 4. The AP 700 may also be referred to as a first AP or a supplicant. The AP 700 comprises at least one processor 710 and a memory 720 coupled to at least one processor 710. The memory 720 stores instructions to cause at least one processor 710 to implement actions.

As illustrated in FIG. 7, the memory 720 stores instructions 721 to broadcast a probe request including a first identifier of the first AP and a first random number. The memory 720 further stores instructions 722 to receive a probe response including a second identifier of the second AP and a second random number from the second AP. The memory 720 further stores instructions 723 to generate a first service set identifier (SSID) based on the first identifier, the first random number, the second identifier and the second random number. The memory 720 further stores instructions 724 to transmit an authentication request including the first SSID to the second AP. The memory 720 further stores instructions 725 to receive an authentication response to the authentication request from the second AP.

Figure 8:
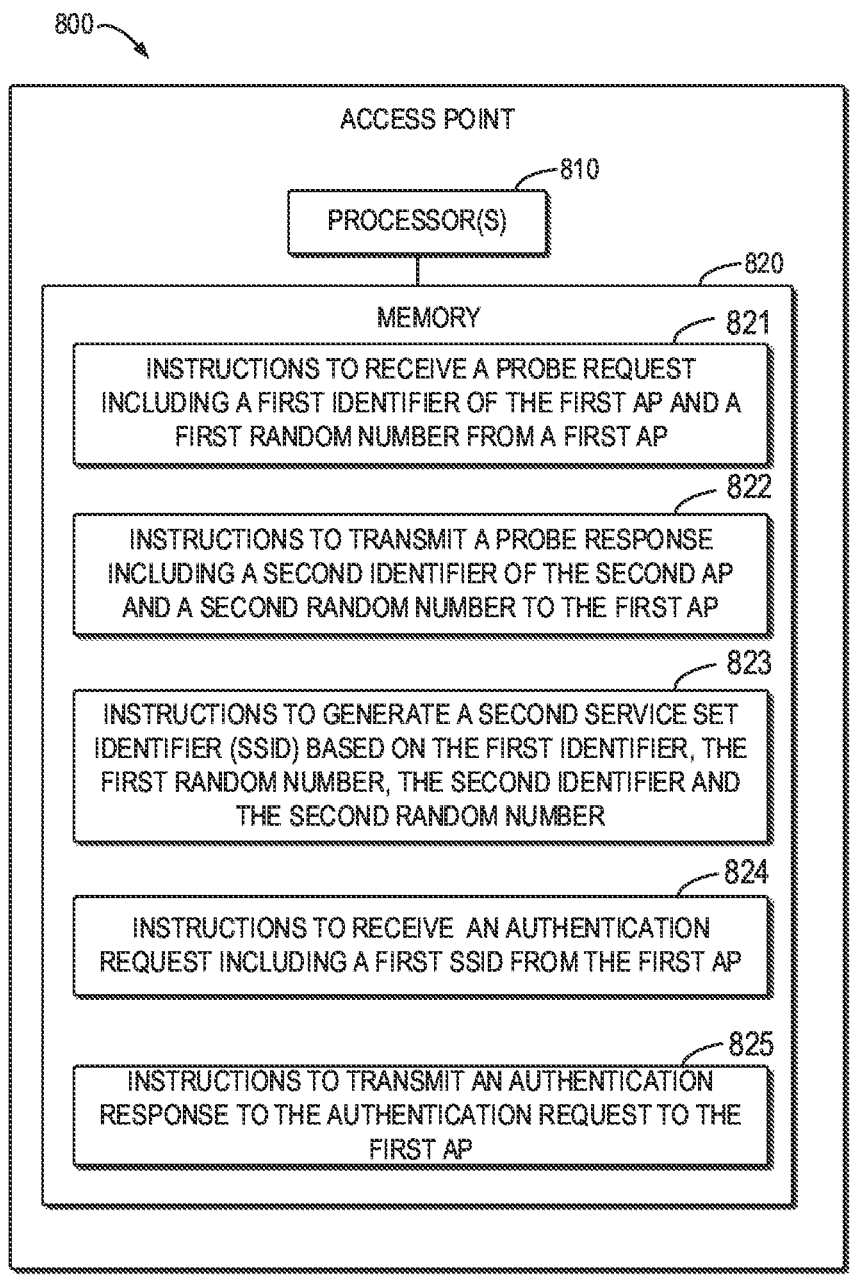
FIG. 8 illustrates a block diagram of a further example AP in accordance with some example implementations of the present disclosure.

FIG. 8 illustrates a block diagram of an example AP 800 in accordance with some example implementations of the present disclosure. The AP 800 may be corresponding to the mesh AP 120-3 in FIG. 1, the mesh AP 301 in FIG. 3, and the mesh AP 420 in FIG. 4. The AP 800 may also be referred to as a second AP or an authenticator. The AP 800 comprises at least one processor 810 and a memory 820 coupled to at least one processor 810. The memory 820 stores instructions to cause at least one processor 810 to implement actions.

As illustrated in FIG. 8, the memory 820 stores instructions 821 to receive a probe request including a first identifier of the first AP and a first random number from the first AP. The memory 820 stores instructions 822 to transmit a probe response including a second identifier of the second AP and a second random number to the first AP. The memory 820 stores instructions 823 to generate a second service set identifier (SSID) based on the first identifier, the first random number, the second identifier and the second random number. The memory 820 stores instructions 824 to receive an authentication request including a first SSID from the first AP. The memory 820 stores instructions 825 to transmit an authentication response to the authentication request to the first AP.

The present disclosure also provides at least one computer program product tangibly stored on a non-transitory computer-readable storage medium. The computer program product includes program codes or instructions which can be executed to carry out the method as described above with reference to FIGS. 2C-2D and 5-6 and procedures as described above with reference to FIGS. 2A-3.

While the above discussion used a Wi-Fi communication standard as an illustrative example, in other implementations a wide variety of communication standards and, more generally, wireless communication technologies may be used. Furthermore, while some of the operations in the foregoing implementations were implemented in hardware or software, in general, the operations in the preceding implementations can be implemented in a wide variety of configurations and architectures. Therefore, some or all of the operations in the foregoing implementations may be performed in hardware, software, or both.

It should be noted that specific terms disclosed in the present disclosure are proposed for convenience of description and a better understanding of example implementations of the present disclosure, and the use of these specific terms may be changed to another format within the technical scope or spirit of the present disclosure.

Program codes or instructions for carrying out methods of the present disclosure may be written in any combination of one or more programming languages. These program codes or instructions may be provided to a processor or controller of a general-purpose computer, special-purpose computer, or other programmable data processing apparatus, such that the program codes, when executed by the processor or controller, cause the functions/operations specified in the flowcharts and/or block diagrams to be implemented. The program code or instructions may execute entirely on a machine, partly on the machine, as a stand-alone software package, partly on the machine and partly on a remote machine, or entirely on the remote machine or server.

In the context of this disclosure, a computer-readable medium may be any tangible medium that may contain or store a program for use by or in connection with an instruction execution system, apparatus, or device. The computer-readable medium may be a computer-readable signal medium or a computer-readable storage medium. A computer-readable medium may include but not limited to an electronic, magnetic, optical, electromagnetic, infrared, or semiconductor system, apparatus, or device, or any suitable combination of the foregoing. More specific examples of the computer-readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order illustrated or in sequential order or that all illustrated operations be performed to achieve desirable results. In certain circumstances, multitasking and parallel processing may be advantageous. Certain features that are described in the context of separate implementations may also be implemented in combination in a single implementation. Conversely, various features that are described in the context of a single implementation may also be implemented in multiple implementations separately or in any suitable sub-combination.

In the foregoing Detailed Description of the present disclosure, reference is made to the accompanying drawings that form a part hereof, and in which is illustrated by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

What is claimed is:

1. A method comprising:
    broadcasting, by a first access point (AP), a probe request including a first identifier of the first AP and a first random number;
    receiving, by the first AP and from a second AP, a probe response including a second identifier of the second AP and a second random number;
    generating, by the first AP, a first service set identifier (SSID) based on the first identifier, the first random number, the second identifier and the second random number;
    transmitting, by the first AP and to the second AP, an authentication request including the first SSID; and
    receiving, by the first AP and from the second AP, an authentication response to the authentication request,
    wherein generating the first SSID includes:
        obtaining, by the first AP, a first basic service set identifier (BSSID) of the first AP, a second BSSID of the second AP and a predefined key associated with the first AP and the second AP,
        generating, by the first AP, an intermediate key based on the first identifier, the first random number, the second identifier, the second random number, the first BSSID, the second BSSID and the predefined key,
        generating, by the first AP, the first SSID based on the intermediate key; and
        encrypting, by the first AP, the first SSID with the intermediate key.

2. The method of claim 1, wherein generating the intermediate key comprises:
    determining, by the first AP, a first sum of the first identifier, the first random number, the second identifier, the second random number, the first BSSID, the second BSSID and the predefined key; and
    determining, by the first AP, a hash of the first sum as the intermediate key.

3. The method of claim 1, wherein generating the first SSID based on the intermediate key comprises:
    determining, by the first AP, a second sum of the first identifier, the first random number, the second identifier, the second random number, the first BSSID, the second BSSID, the predefined key and the intermediate key; and
    determining, by the first AP, a hash of the second sum as the first SSID.

4. The method of claim 1, further comprising:
    obtaining, by the first AP, a second SSID of the second AP encrypted with the intermediate key based on the authentication response;
    decrypting, by the first AP, the encrypted second SSID with the intermediate key to obtain the second SSID; and
    in response to determining that the second SSID is the same as the first SSID, transmitting, by the first AP to the second AP, an association request.

5. The method of claim 4, further comprising:
    in response to determining that the second SSID is different from the first SSID, disconnecting, by the first AP, with the second AP.

6. The method of claim 1, further comprising:
    receiving, by the first AP from the second AP, an encrypted first message including a first nonce;
    decrypting, by the first AP, the encrypted first message with the intermediate key to obtain the first nonce; and
    encrypting, by the first AP, a second message with the intermediate key, the second message including a second nonce;
    transmitting, by the first AP to the second AP, the encrypted second message; and
    generating, by the first AP, a pairwise key based on the first nonce and the second nonce.

7. The method of claim 6, further comprising:
in response to receiving the first message, determining, by the first AP, whether the first message is encrypted; and
in response to determining that the first message is not encrypted, discarding, by the first AP, the first message.

8. The method of claim 6, further comprising:
in response to determining that a timer for updating the pairwise key associated with a first link is expired, transmitting, by the first AP to the second AP on a second link, a trigger frame for negotiation of a new pairwise key, the first link being established between a first VAP of the first AP and a second VAP of the second AP, and the second link being established between a third VAP of the first AP and a fourth VAP of the second AP;
encapsulating, by the first AP, key negotiation frames in data frames; and
performing, by the first AP, the negotiation by exchanging the data frames with the second AP on the first link to obtain the new pairwise key.

9. The method of claim 8, further comprising:
in response to obtaining a new pairwise key, disconnecting, by the first AP, the first link with the second AP.

10. A method comprising:
receiving, by a second access point (AP) and from a first AP, a probe request including a first identifier of the first AP and a first random number;
transmitting, by the second AP to the first AP, a probe response including a second identifier of the second AP and a second random number;
generating, by the second AP, a second service set identifier (SSID) based on the first identifier, the first random number, the second identifier and the second random number;
receiving, by the second AP and from the first AP, an authentication request including a first SSID; and
transmitting, by the second AP and to the first AP, an authentication response to the authentication request, wherein generating the second SSID includes:
 obtaining, by the second AP, a first basic service set identifier (BSSID) of the first AP, a second BSSID of the second AP and a predefined key associated with the first AP and the se AP;
 generating, by the second AP, an intermediate key based on the first identifier, the first random number, the second identifier, the second random number, the first BSSID, the second BSSID and the predefined key;
 generating, by the second AP, the second SSID based on the intermediate key; and
 encrypting, by the second AP, the second SSID with the intermediate key.

11. The method of claim 10, further comprising:
obtaining, by the second AP, an encrypted first SSID from the authentication request;
retrieving, by the second AP, the intermediate key based on the first BSSID from a mapping table, the mapping table including intermediate keys associated with APs connected with the second AP, and the intermediate keys being indexed by corresponding BSSID;
decrypting, by the second AP, the encrypted first SSID with the intermediate key to obtain the first SSID; and
in response to determining that the first SSID is the same as the second SSID, transmitting, by the second AP to the first AP, an authentication response.

12. The method of claim 11, further comprising:
in response to determining that the first SSID is different from the second SSID, disconnecting, by the second AP, with the first AP.

13. The method of claim 10, further comprising:
encrypting, by the second AP, a first message with the intermediate key, the first message including a first nonce;
transmitting, by the second AP to the first AP, the encrypted first message;
receiving, by the second AP and from the first AP, an encrypted second message including a second nonce;
decrypting, by the second AP, the encrypted second message with the intermediate key to obtain the second nonce; and
generating, by the second AP, a pairwise key based on the first nonce and the second nonce.

14. The method of claim 13, further comprising:
in response to receiving the second message, determining, by the second AP, whether the second message is encrypted; and
in response to determining that the second message is not encrypted, discarding, by the second AP, the second message.

15. The method of claim 14, further comprising:
receiving, by the second AP from the first AP, a trigger frame for negotiation of a new pairwise key associated with a first link on a second link, the first link being established between a first VAP of the first AP and a second VAP of the second AP, and the second link being established between a third VAP of the first AP and a fourth VAP of the second AP;
encapsulating, by the second AP, key negotiation frames in data frames; and
performing, by the second AP, the negotiation by exchanging the data frames with the first AP on the first link to obtain the new pairwise key.

16. The method of claim 15, wherein encapsulating the key negotiation frames comprises:
generating, by the second AP, a key negotiation frame;
adding, by the second AP, an indicator field in front of a header of the key negotiation frame to identify the key negotiation frame;
encapsulating, by the second AP, the negotiation frame and the indicator field as payload in a data frame; and
encrypting, by the second AP, the data frame with the pairwise key.

17. The method of claim 16, further comprising:
receiving, by the second AP from the first AP, a data frame;
determining, by the second AP, whether a timer for updating the pairwise key is expired;
in response to determining that the timer is expired, parsing, by the second AP the data frame to detect the indicator field; and
in response to determining that the indicator field identifies the data frame including a key negotiation frame, decapsulating, by the second AP, the key negotiation frame.

18. A first access point (AP) comprising:
at least one processor; and
a memory coupled to the at least one processor, the memory storing instructions to cause the at least one processor to:
 broadcast a probe request including a first identifier of the first AP and a first random number;

receive, from a second AP, a probe response including a second identifier of the second AP and a second random number;

generate a first service set identifier (SSID) based on the first identifier, the first random number, the second identifier and the second random number;

transmit, to the second AP, an authentication request including the first SSID; and receive, from the second AP, an authentication response to the authentication request, wherein generating of the first SSID includes causing the at least one processor to:

obtain, by the first AP, a first basic service set identifier (BSSID) of the first AP, a second BSSID of the second AP and a predefined key associated with the first AP and the second AP, generate, by the first AP, an intermediate key based on the first identifier, the first random number, the second identifier, the second random number, the first BSSID, the second BSSID and the predefined key, generate, by the first AP, the first SSID based on the intermediate key; and encrypt, by the first AP, the first SSID with the intermediate key.

* * * * *